(12) United States Patent
Naitou

(10) Patent No.: US 10,675,759 B2
(45) Date of Patent: Jun. 9, 2020

(54) INTERFERENCE REGION SETTING APPARATUS FOR MOBILE ROBOT

(71) Applicant: FANUC CORPORATION, Minamitsuru-gun, Yamanashi (JP)

(72) Inventor: Yasuhiro Naitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 67 days.

(21) Appl. No.: 15/830,216

(22) Filed: Dec. 4, 2017

(65) Prior Publication Data

US 2018/0161978 A1 Jun. 14, 2018

(30) Foreign Application Priority Data

Dec. 8, 2016 (JP) ................................. 2016-238688

(51) Int. Cl.
*G05B 19/18* (2006.01)
*B25J 9/16* (2006.01)
(Continued)

(52) U.S. Cl.
CPC ............... *B25J 9/1666* (2013.01); *B25J 5/00* (2013.01); *B25J 5/007* (2013.01); *B25J 9/1676* (2013.01);
(Continued)

(58) Field of Classification Search
CPC ........ B25J 9/1666; B25J 19/023; B25J 5/007; B25J 5/00; B25J 9/16; B25J 9/1676; B25J 3/04; B25J 9/00; B25J 9/0081; B25J 13/00; B25J 9/1674; G06T 7/50; G06T 7/70; G06T 7/60; Y10S 901/47; Y10S 901/00;
(Continued)

(56) References Cited

U.S. PATENT DOCUMENTS 9,610,690 B2 4/2017 Maeda
10,131,053 B1 * 11/2018 Sampedro .............. B25J 9/1666
(Continued)

FOREIGN PATENT DOCUMENTS

CN 105415387 A 3/2016
CN 105437232 A 3/2016
(Continued)

*Primary Examiner* — Khoi H Tran
*Assistant Examiner* — B M M Hannan
(74) *Attorney, Agent, or Firm* — RatnerPrestia

(57) ABSTRACT

An interference region setting apparatus capable of setting an interference region in a coordinate system of a mobile robot, with an inexpensive configuration and a little effort. The apparatus has: a shape model storage section configured to store a shape, a position, and an orientation of an obstruction present in a work region of the mobile robot as an obstruction shape model, in a reference coordinate system; a position and orientation calculation section configured to analyze an image, captured by the image capturing apparatus, of a shape feature in a fixed position within the work region, and calculate a position and orientation of the reference coordinate system represented in a robot coordinate system; and an interference region setting section configured to set an interference region based on the position and orientation of the reference coordinate system converted into the robot coordinate system and the stored obstruction shape model.

4 Claims, 2 Drawing Sheets

(51) Int. Cl.
*G06T 7/50* (2017.01)
*B25J 5/00* (2006.01)
*B25J 19/02* (2006.01)
*G06T 7/70* (2017.01)
*G06T 7/60* (2017.01)
*H04N 7/18* (2006.01)

(52) U.S. Cl.
CPC .............. *B25J 19/023* (2013.01); *G06T 7/50* (2017.01); *G06T 7/60* (2013.01); *G06T 7/70* (2017.01); *G05B 2219/40298* (2013.01); *H04N 7/185* (2013.01); *Y10S 901/47* (2013.01)

(58) Field of Classification Search
CPC ............... H04N 7/185; G05B 2219/39; G05B 19/4086; G05B 19/4061; G05D 1/00; G05D 2201/02; G06K 9/00664; G06K 9/00791; G06K 2209/19; A47L 2201/00; A61B 34/00
USPC .................. 701/245, 251, 255; 382/153, 309
See application file for complete search history.

(56) References Cited

U.S. PATENT DOCUMENTS

| | | | | |
|---|---|---|---|---|
| 2002/0169522 A1* | 11/2002 | Kanno | ............... | B25J 9/1666 700/245 |
| 2004/0013295 A1* | 1/2004 | Sabe | ............... | G06K 9/00664 382/153 |
| 2005/0055134 A1* | 3/2005 | Okuda | ............... | B25J 9/1666 700/245 |
| 2005/0131581 A1* | 6/2005 | Sabe | ............... | G06K 9/00201 700/245 |
| 2006/0241827 A1* | 10/2006 | Fukuchi | ............... | G05D 1/0251 701/23 |
| 2007/0150093 A1* | 6/2007 | Nagatsuka | ............... | B25J 9/1682 700/235 |
| 2010/0292843 A1* | 11/2010 | Kariyazaki | ............... | B25J 9/1676 700/264 |
| 2012/0271502 A1* | 10/2012 | Lee | ............... | G05D 1/0246 701/26 |
| 2014/0277737 A1 | 9/2014 | Sekiyama et al. | | |
| 2016/0239952 A1* | 8/2016 | Tanaka | ............... | G01D 5/26 |
| 2016/0288318 A1* | 10/2016 | Nakazato | ............... | B25J 9/1666 |

FOREIGN PATENT DOCUMENTS

| | | |
|---|---|---|
| CN | 106052674 A | 10/2016 |
| DE | 102008052579 A1 | 4/2010 |
| JP | H 08-005028 B | 1/1996 |
| JP | 2001300875 A | 10/2001 |
| JP | 2005-081445 A | 3/2005 |
| JP | 2010-162635 A | 7/2010 |
| JP | 2012061558 A | 3/2012 |
| JP | 2014180707 A | 9/2014 |
| JP | 2016-078184 A | 5/2016 |
| WO | 2014058161 A1 | 4/2014 |

* cited by examiner

INTERFERENCE REGION SETTING APPARATUS FOR MOBILE ROBOT

CROSS-REFERENCE TO RELATED APPLICATIONS

This application is a new U.S. Patent Application that claims benefit of Japanese Patent Application No. 2016-238688, filed Dec. 8, 2016, the disclosure of this application is being incorporated herein by reference in its entirety for all purposes.

BACKGROUND OF THE INVENTION

1. Field of the Invention

The present invention relates to an interference region setting apparatus that sets an interference region for a mobile robot.

2. Description of the Related Art

A technique is known in which when using a robot mounted on a mobile truck or a robot including a self-propelling mechanism (what is known as a mobile robot), an operation is carried out by detecting positions in the work environment of the robot. As an example of the related art pertaining to such a technique, JP 2010-162635 A discloses a method for correcting the position and orientation of a self-propelled robot including a self-propelled traveling unit and a robot arm unit mounted on the traveling unit. The method includes: a step of detecting, at a predetermined position in a travel path, error from a set position and orientation of the traveling unit as first error, and controlling the operation of the traveling unit to correct the first error; and a step of detecting, at a predetermined work position on the travel path where the robot arm unit is to work on a work object, error from the set position and orientation of the robot arm unit as second error, and controlling the operation of the robot arm unit to correct the second error.

Furthermore, a technique has also been proposed for determining, in the case where an obstruction such as a peripheral device is present within a work region reachable by a mobile robot, whether or not the obstruction and the mobile robot will interfere with each other. For example, JP H08-005028 B discloses a moving object collision determination method that determines whether or not a moving object and an obstruction will collide by approximating the shapes of the moving object and the obstruction using a plurality of object elements and checking for interference between corresponding object elements. This method includes, when determining whether or not the moving object and the obstruction will collide on the basis of the position/orientation of the moving object at the current time to check for interference, determining an execution order for the interference check by combining corresponding object elements in descending order in terms of likelihood of a collision, on the basis of the collision determination result obtained on the basis of the previous position/orientation of the moving object and data required for the collision determination, including at least a distance.

Additionally, JP 2005-081445 A discloses a robot interference region confirming apparatus including: means for storing a shape model of an arm of a robot; occupied region calculation means for, on the basis of position and orientation information provided for the robot and the shape model of the arm of the robot, finding a region occupied by the arm of the robot in the case where the arm of the robot has taken on a position and orientation corresponding to the position and orientation information; transfer means for, on the basis of a movement command read from a robot articulation program, sequentially finding position and orientation information corresponding to positions and orientations to be taken by the arm of the robot and transferring the information to the occupied region calculation means; storage means for cumulatively adding, as a set, the occupied region received this time from the occupied region calculation means to an overall occupied region updated and stored the previous time to update and store a new overall occupied region; and display means having a function for displaying the overall occupied region stored in the storage means.

Furthermore, JP 2016-078184 A discloses a robot interference region setting apparatus including: a 3D camera that, by capturing an image of the periphery of a robot, obtains a camera image of a region in the periphery of the robot, the camera image including distance information and color information; a 3D map generating unit that generates, on the basis of the camera image, a 3D map constituted of a plurality of point sequences arranged at equal intervals in three-dimensional space in the periphery of the robot, each of the point sequences having the color information included in the camera image; a color setting unit that sets a color that is the color of at least one of the robot and an obstruction in the periphery of the robot, and that is a color by which the robot and the obstruction can be distinguished from each other; a color search unit that searches out a point sequence having color information corresponding to the color set by the color setting unit from the 3D map generated by the 3D map generating unit; and an interference region setting section that sets an interference region on the basis of position data obtained from the distance information of the camera image, the position data being data of the point sequence searched out by the color search unit.

As an example of means for finding an interference region between a mobile robot and an obstruction, an operation for setting and recording a shape model of the obstruction in association with a position represented in a robot coordinate system can be used. However, if the mobile robot is moved, it is necessary to reset the position of the shape model of the obstruction relative to the robot after the movement. If this setting is done manually, significant effort is required each time the robot is moved, reducing the convenience of the mobile robot. Although the above setting can be automatically configured by using a 3D camera, the 3D camera (and particularly a 3D camera that can also detect color information of subjects) is expensive, which is problematic in terms of cost.

SUMMARY OF THE INVENTION

One aspect of the present disclosure is an interference region setting apparatus that sets an interference region for a mobile robot including a traveling unit capable of moving, a robot mechanical unit mounted on the traveling unit, and an image capturing apparatus configured to obtain an image of the periphery of the robot mechanical unit, the interference region setting apparatus including: a shape model storage section configured to store a shape, a position, and an orientation of an obstruction present in a work region of the mobile robot as an obstruction shape model, the shape, position, and orientation being represented in a reference coordinate system serving as a reference for the work region; a position and orientation calculation section configured to analyze an image, captured by the image capturing apparatus, of a shape feature in a fixed position within the work region, and calculate a position and orientation of the reference coordinate system represented in a robot coordinate system serving as a reference for the mobile robot; and an interference region setting section configured to set an interference region on the basis of the position and orientation of the reference coordinate system converted into the robot coordinate system and the obstruction shape model, the interference region being a region represented in the robot coordinate system where the obstruction is present.

BRIEF DESCRIPTION OF THE DRAWINGS

The above-described and other objects, features, and advantages of the present invention will become more apparent from the following description of the embodiments in connection with the accompanying drawings.

DETAILED DESCRIPTION

Figure 1:
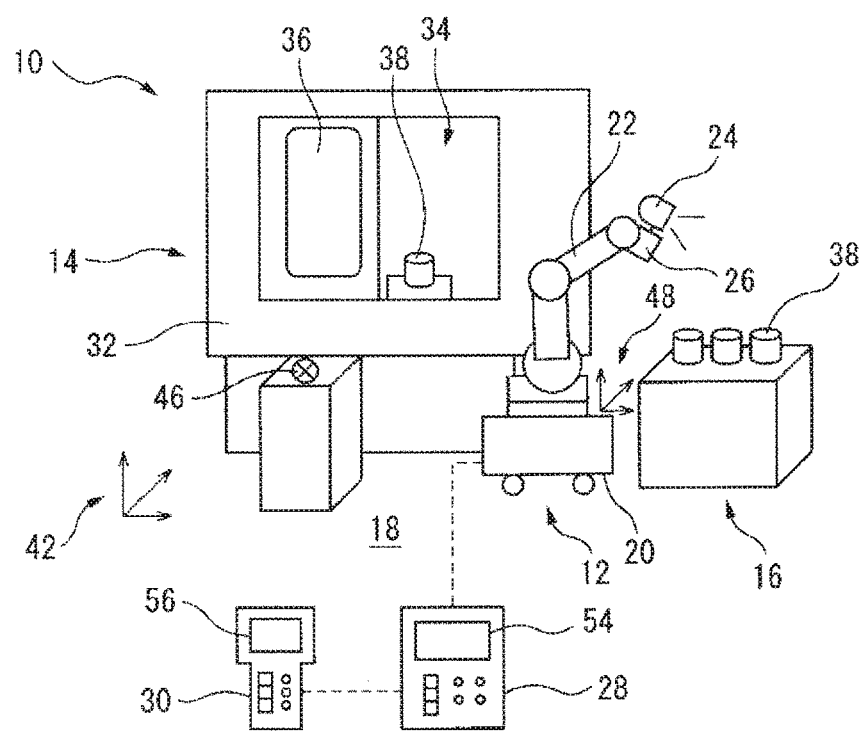
FIG. 1 is a diagram illustrating an example of a system in which an interference region setting apparatus according to an embodiment of the present invention can be applied.

FIG. 1 is a diagram illustrating the overall configuration of a processing system 10 as an example of a system that can set an interference region using an interference region setting apparatus according to an embodiment of the present invention. The processing system 10 includes a mobile robot 12, a machine tool 14, and a workpiece supply table 16. The mobile robot 12 includes a traveling unit 20 capable of moving relative to an installation surface 18, a robot mechanical unit (robot arm) 22 mounted on the traveling unit 20, and an image capturing apparatus 24 configured to obtain an image of the periphery of the robot mechanical unit 22.

The traveling unit 20 is a truck, for example, and may be a self-propelled type including a drive source, or may travel by being pushed by a person (a worker). The robot mechanical unit 22 is, for example, an articulated robot having a plurality of axes. In the example shown, the image capturing apparatus 24 is a camera attached to a mobile part of the robot (the tip of the robot arm or a robot hand 26) or the traveling unit 20. Note that the camera may be a three-dimensional camera or a two-dimensional camera, but a two-dimensional camera that captures a two-dimensional image of the periphery (and particularly a two-dimensional black-and-white image) is preferable in terms of cost. Operation of the mobile robot 12 can be controlled by a robot controller 28. Note that a teach pendant 30 through which a worker carries out operations such as teaching the robot 12 may be connected to the robot controller 28 wirelessly or over a wire.

As one example, the machine tool 14 includes a cover 32, a processing chamber 34 defined by the cover 32, and an openable/closable door 36 provided in a part of the cover 32. The machine tool 14 is configured to carry out predetermined processing on a processing subject (workpiece) 38 transported to the interior of the processing chamber 34 through the door 36. The mobile robot 12 is configured to be capable of traveling to the vicinity of the workpiece supply table 16, gripping an unprocessed workpiece 38 placed on the workpiece supply table 16 with a hand, etc., then traveling to the vicinity of the machine tool 14, and placing the gripped workpiece in a predetermined position within the processing chamber 34. The mobile robot 12 may further be configured to remove processed workpieces from the processing chamber 34 and transport the workpieces to a predetermined destination.

In the system 10, when the mobile robot 12 travels, the robot mechanical unit (robot arm) 22 operates, etc., there are situations where the machine tool 12, the workpiece supply table 16, or columns and structures not illustrated here (referred to collectively as "obstructions") within the work region of the mobile robot 12, and the mobile robot 12, interfere with each other. For example, in the case where the robot 12 advances into the machine tool 14 (the processing chamber 34) to carry out an operation while the door 36 of the machine tool 14 is open, there is a risk that the robot 12 will interfere with the door 36, the cover 32, etc. Accordingly, in the present embodiment, an interference region, which is a region where an obstruction is present, is set for the mobile robot 12 (or the robot controller 28 thereof), and the operation of the robot 12 is controlled so that the robot 12 does not enter the interference region. Note that the "work region" of the mobile robot 12 means a maximum spatial region that can be reached by at least part of the mobile robot 12, and can be set on the basis of, for example, a maximum travel range of the traveling unit 20 and a maximum operating range of the robot mechanical unit 22.

Figure 2:
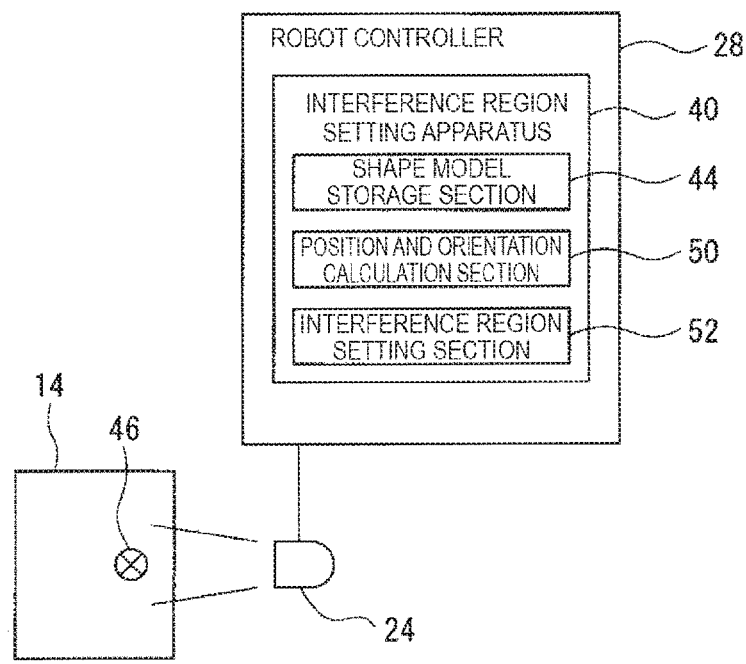
FIG. 2 is a function block diagram illustrating the interference region setting apparatus according to the embodiment of the present invention.

The setting of the interference region will be described in detail below. FIG. 2 is a function block diagram illustrating an interference region setting apparatus 40 according to the present embodiment. An example in which the apparatus is incorporated into the robot controller 28 as a processor, memory, etc., is illustrated here. However, the interference region setting apparatus 40 can also be an apparatus separate from the robot controller 28, such as a personal computer. In such a case, it is preferable that the apparatus and the robot controller 28 be capable of communicating over a wire or wirelessly.

The interference region setting apparatus 40 includes: a shape model storage section 44 that stores a shape, a position, and an orientation of an obstruction (the machine tool 14 and the workpiece supply table 16, in the example illustrated) present in the work region of the mobile robot 12 as an obstruction shape model (a three-dimensional model), the shape, position, and orientation being represented in a reference coordinate system 42; a position and orientation calculation section 50 that analyzes an image, captured by the image capturing apparatus 24, of a shape feature 46 in a fixed position within the work region, and calculates a position and orientation of the reference coordinate system 42 represented in a robot coordinate system 48; and an interference region setting section 52 that sets an interference region on the basis of the position and orientation of the reference coordinate system 42 converted into the robot coordinate system 48 and the stored obstruction shape model, the interference region being a region represented in the robot coordinate system 48 where the obstruction is present.

The reference coordinate system 42 is a coordinate system serving as a reference for the work region of the system 10, and is, for example, a fixed coordinate system fixed to the installation surface 18, a coordinate system defined with respect to the machine tool 14, etc. It is assumed that the positional relationship between the reference coordinate system 42 and obstructions such as the machine tool 14 or the workpiece supply table 16 is already known. On the other hand, the robot coordinate system 48 is a coordinate system serving as a reference for the mobile robot 12, and is, for example, a coordinate system fixed to the traveling unit 20 or a part of the robot mechanical unit 22 that does not change position relative to the traveling unit 20 (a rotating body, etc.).

The shape feature (marker) 46 is a structure, printed object, etc., having certain shape features, provided in a fixed position capable of being captured by the image capturing apparatus 24. By carrying out image processing on an image of the marker 46 obtained by the image capturing apparatus 24, the two-dimensional position or three-dimensional position and the orientation of the marker 46 represented in the robot coordinate system 48 can be calculated. Various items can be used as the marker 46, and for example, a logo, structure, etc., already present on the machine tool 14 can also be used as the marker. It is assumed that the positional relationship between the marker 46 and the reference coordinate system 42 is already known. Thus, the position and orientation of the reference coordinate system 42 converted into the robot coordinate system 48 can be calculated through image analysis using the image capturing apparatus 24. Such calculations (coordinate conversions) can be carried out through a known method. When using a plurality of markers, the coordinate conversion is carried out having obtained images of each of the markers.

Note that the number, shape, etc., of the marker 46 can be selected and changed as appropriate depending on whether the position of the marker 46 to calculate represented in the robot coordinate system 48 is two-dimensional or three-dimensional. For example, in the case where the heights of the mobile robot 12 and obstructions such as the machine tool 14 are constant, it is not necessary to capture the position of the marker 46 in the height direction. Thus, if one or two simple circular markers are provided, the two-dimensional position and orientation of the reference coordinate system 42 converted into the robot coordinate system 48 in a plane parallel to the installation surface 18 can be found. If three markers are provided, the three-dimensional position and orientation of the reference coordinate system 42 converted into the robot coordinate system 48 can be found even when using a two-dimensional camera. Alternatively, depending on the shape of the marker (e.g., a shape in which intersecting cross lines are arranged within a circle, as illustrated), the three-dimensional position and orientation of the reference coordinate system 42 converted into the robot coordinate system 48 can be found from even a single marker, by carrying out image processing on the marker.

The shape, position, and orientation, represented in the reference coordinate system 42, of the obstruction present in the work region of the mobile robot 12 is stored in the shape model storage section 44 in advance as an obstruction shape model. For example, the reference coordinate system 42 is defined on the machine tool 14, and a shape model of the machine tool 14 represented in the reference coordinate system 42 is stored in the shape model storage section 44, which is memory, etc. In the embodiment, the shape model may be defined by a combination of elements such as rectangular cuboids, or may be defined by a 3D map constituted of a plurality of point sequences.

The interference region, which is a region represented in the robot coordinate system 48 where an obstruction is present, can be set in the mobile robot 12 (the robot controller 28 thereof) on the basis of the obstruction shape model stored as described above and the position and orientation of the reference coordinate system 42 converted into the robot coordinate system 48. Specifically, a three-dimensional interference region can be calculated by carrying out the above-described coordinate conversion on the obstruction shape model. The robot controller 28 can then command the mobile robot 12 to operate so as to avoid the set interference region. The image capturing processing of the marker 46, the setting processing of the interference region, etc., can be carried out automatically. As such, even if the mobile robot 12 has been moved to a different position by the traveling unit 20, the interference region can easily be set automatically with a level of precision sufficient for practical use, making it unnecessary to carry out burdensome operations such as manually setting the interference region with each movement.

Figure 3:
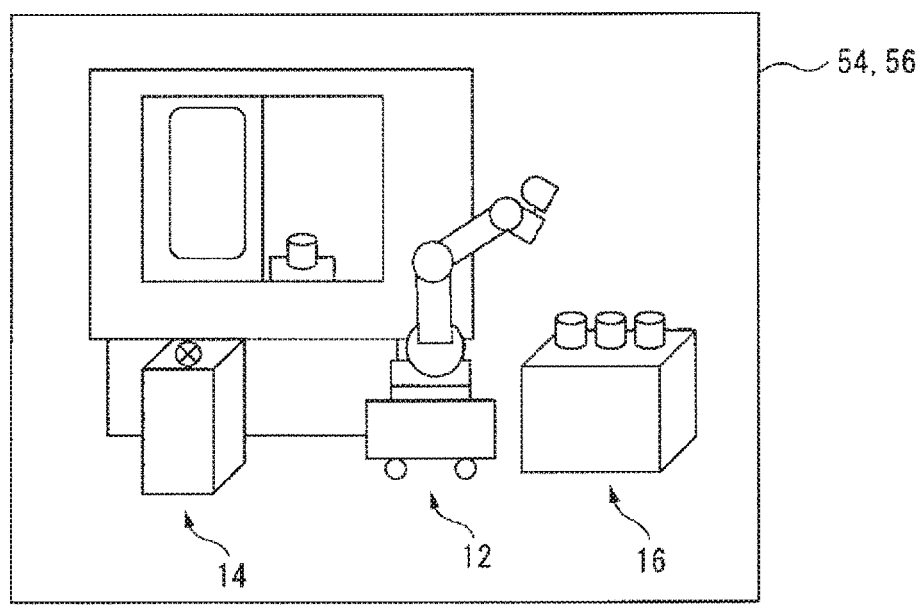
FIG. 3 is a diagram illustrating an example of a display function in the interference region setting apparatus illustrated in FIG. 2.

FIG. 3 is a diagram illustrating a display command function of the interference region setting apparatus 40. The interference region setting apparatus 40 has a function for, when the above-described interference region has been set, displaying information pertaining to the position and orientation, represented in the robot coordinate system 48, of the interference region set by the interference region setting section 52 (here, the regions occupied by the machine tool 14 and the workpiece supply table 16) in a suitable display unit along with the mobile robot 12 (a display command function). For example, a display 54 of the robot controller 28 or a display 56 of the teaching pendant 30 (see FIG. 1) can be used as the display unit (a display screen). In the case where the interference region setting apparatus 40 is a device separate from the robot controller 28, such as a personal computer, a display (not illustrated) of that personal computer, etc., can be used as well. Any display means can be used as long as the display means can be seen by a person (a worker). It is possible to display the profile (contours) of the obstruction in a simplified manner. Although it is preferable that the information displayed in the screen be three-dimensional, the information may be two-dimensional.

With the above-described display function, a worker can confirm the presence of an obstruction that can interfere with the mobile robot 12, and can compare the actual state of the system 10 (the arrangement of devices, etc.) with the content displayed in the screen. For example, in the case where a bolt that fixes a camera 24 to the mobile robot 12 has loosened, etc., and the position or orientation of the camera 24 shifts from a predetermined position or orientation, the shift will greatly affect a result of the camera 24 capturing an image of the marker 46 (the detection of the position of the obstruction), even if the shift is so slight it is difficult to recognize visually. As a result, the arrangement of the devices displayed in the screen will greatly deviate from the actual arrangement, and there is a risk of interference if the robot is operated in such a state. Accordingly, the worker can recognize whether or not a problem pertaining to the settings, structure, etc., of the actual system, such as shifting in the position of the camera 24, has arisen through the screen display of the interference region represented in the robot coordinate system.

The interference region setting apparatus 40 may also include an output function for, when an interference region has been newly set, displaying a message requesting confirmation, such as "please confirm the change in interference region", in a suitable display screen such as the display 56 of the teaching pendant 30, outputting the message as audio, etc. In this case, a person can compare the actual positional relationship between the mobile robot 12 and an obstruction such as the machine tool 14 with the positional relationship between the mobile robot 12 and the interference region displayed in the screen, and confirm whether there are errors in the settings of the system 10, structural problems such as shift in the position of the camera 24, etc. If there are no problems, the person inputs his/her confirmation of the details of the settings pertaining to the interference region into the interference region setting apparatus 40 through suitable input means such as a keyboard or an operation panel.

The interference region setting apparatus 40 can further include an operation prohibiting function for prohibiting the mobile robot 12 from operating from when the interference region is set to when such input is received. More specifically, a command (a signal, etc.) indicating the mobile robot 12 is prohibited from operating can be sent to the robot controller 28 until there is an input from a worker. By doing so, the mobile robot can be prohibited from operating until a person confirms that there are no problems with the setting of the interference region, which makes it possible to reliably prevent the robot from operating on the basis of an inaccurate or inappropriate interference region.

According to an aspect of the present disclosure, an interference region for after a mobile robot has been moved can be set with a level of precision sufficient for practical use, with an inexpensive and simple configuration.

While the invention has been described with reference to specific embodiments, it will be understood, by those skilled in the art, that various changes or modifications may be made thereto without departing from the scope of the following claims.

The invention claimed is:

1. An interference region setting apparatus that sets an interference region for a mobile robot mounted on a traveling unit and configured to move within a work region, an articulated portion, extending from a base of the mobile robot and having a plurality of axes, and an image capturing apparatus configured to obtain an image of a periphery of the articulated portion, the interference region setting apparatus comprising:
a processor configured to:
store a shape, a position, and an orientation of an obstruction by a peripheral object present in the work region of the mobile robot as an obstruction shape model, the shape, position, and orientation of the peripheral object being represented in a reference coordinate system serving as a reference for the work region, wherein the obstruction by the peripheral object interferes with travel of the mobile robot on the traveling unit in the work region;
analyze an image, captured by the image capturing apparatus, of a marker in a fixed position of the reference coordinate system within the work region to determine a position and orientation of the marker in a robot coordination system serving as a reference for the mobile robot, and calculate a position and orientation of the obstruction shaped model, stored in the reference coordinate system, in the robot coordination system relative to the analyzed position and orientation of the marker in the robot coordination system;
automatically set an interference region on the basis of the position and orientation of the obstruction shaped model stored in the reference coordinate system and converted into the robot coordinate system relative to the marker, the interference region being a region represented in the robot coordinate system where the obstruction by the peripheral object in the work region of the mobile robot is present and interferes with the travel of the mobile robot on the traveling unit in the work region; and
command the mobile robot to operate so as to avoid the set interference region,
wherein the reference coordinate system of the work region is a fixed coordinate system with respect to the peripheral object in the work region, and
wherein the robot coordinate system for the mobile robot is fixed relative to the traveling unit.

2. The interference region setting apparatus of claim 1, wherein the image capturing apparatus is a two-dimensional camera.

3. The interference region setting apparatus of claim 1, wherein the processor is further configured to display information pertaining to the position and orientation of the peripheral object, represented in the robot coordinate system, when the interference region is automatically set.

4. The interference region setting apparatus of claim 1, wherein the processor of the interference region setting apparatus includes an operation prohibiting function that prohibits the mobile robot from operating for a duration from when a new interference region is set to when an input indicating that details of the setting of the new interference region have been confirmed is received.

* * * * *